US006706305B2

(12) United States Patent
Wolt et al.

(10) Patent No.: US 6,706,305 B2
(45) Date of Patent: Mar. 16, 2004

(54) LOW GLYCEMIC INDEX BREAD

(75) Inventors: Michael J. Wolt, Gretna, NE (US); Elizabeth A. Arndt, Omaha, NE (US); John R. Hinchik, Omaha, NE (US)

(73) Assignee: ConAgra Foods Inc., Omaha, NE (US)

(*) Notice: Subject to any disclaimer, the term of this patent is extended or adjusted under 35 U.S.C. 154(b) by 30 days.

(21) Appl. No.: 10/001,464

(22) Filed: Oct. 31, 2001

(65) Prior Publication Data

US 2003/0082287 A1 May 1, 2003

(51) Int. Cl.[7] .............................................. A21D 13/00
(52) U.S. Cl. ...................... 426/549; 426/94; 426/615; 426/618
(58) Field of Search ..................... 426/94, 549, 615, 426/618

(56) References Cited

U.S. PATENT DOCUMENTS

| | | | |
|---|---|---|---|
| 4,282,319 A | 8/1981 | Conrad | 435/69 |
| 4,377,602 A | 3/1983 | Conrad | 426/656 |
| 4,379,174 A | 4/1983 | Radlove | 426/554 |
| 4,568,557 A | 2/1986 | Becker et al. | 426/618 |
| 4,711,786 A | 12/1987 | Schmidt | 426/19 |
| 4,741,907 A | 5/1988 | Furuhashi | 426/90 |
| 4,777,045 A | 10/1988 | Vanderveer et al. | 424/195.1 |
| 4,961,937 A * | 10/1990 | Rudel | 426/19 |
| 4,968,694 A | 11/1990 | Madsen et al. | 514/23 |
| 5,151,283 A | 9/1992 | Foehse et al. | 426/93 |
| 5,223,298 A | 6/1993 | Wullschleger et al. | 426/549 |
| 5,227,248 A | 7/1993 | Wullschleger et al. | 426/549 |
| 5,246,723 A | 9/1993 | Kameyama et al. | 426/549 |
| 5,281,432 A | 1/1994 | Zallie et al. | 426/549 |
| 5,364,652 A | 11/1994 | Ohkuma et al. | 426/549 |
| 5,403,610 A * | 4/1995 | Murphy et al. | 426/549 |
| 5,464,644 A | 11/1995 | Wullschleger et al. | 426/549 |
| 5,480,669 A | 1/1996 | Zallie et al. | 426/549 |
| 5,695,803 A | 12/1997 | Sharp et al. | 426/549 |
| 5,698,256 A | 12/1997 | Stilling | 426/656 |
| 5,776,887 A | 7/1998 | Wibert et al. | 514/2 |
| 5,792,506 A | 8/1998 | Buchanan et al. | 426/656 |
| 5,795,606 A | 8/1998 | Lapré et al. | 426/302 |
| 5,807,727 A | 9/1998 | Uchida et al. | 435/201 |
| 5,843,927 A | 12/1998 | DeLuca et al. | 514/167 |
| 5,972,399 A | 10/1999 | Lapré et al. | 426/302 |
| 6,210,702 B1 | 4/2001 | Samman | 424/439 |
| 6,210,722 B1 | 4/2001 | Wullschleger et al. | 426/94 |
| 6,248,375 B1 | 6/2001 | Gilles et al. | 426/72 |
| 6,503,555 B1 * | 1/2003 | Katta et al. | 426/618 |

FOREIGN PATENT DOCUMENTS

WO     WO 94/28743    * 12/1994

OTHER PUBLICATIONS

Newman, R.K. and Newman C.W., Barley as a Food Grain, *Cereal Food World*, Sep. 1991, pp. 800–805, vol. 36, No. 9, American Association of Cereal Chemists, Inc., United States of America.

C. McWard, "Baking and Snack", Integrating value: specialty flours and grains, 1995. Abstract.

Xue, Q., et al., Influence of Hulless, Waxy Starch and Short–awn Genes on the Composition of Barleys, *Journal of Cereal Science*, 1997, pp. 251–257, No. 26, Academic Press Limited, United States of America.

Hallfrisch, L. and Behall, K.M., Improvement in Insulin and Glucose Responses Related to Grains, *Cereal Food World*, Feb. 2000, pp. 66–69, vol. 45, No. 2, American Association of Cereal Chemists, Inc., United States of America.

* cited by examiner

Primary Examiner—Lien Tran
(74) Attorney, Agent, or Firm—Bingham McCutchen LLP

(57) ABSTRACT

A low glycerin index baked bread product is provided. The baked bread product comprises a wheat flour product, a grain/seed source of soluble fiber, and a processed source of soluble fiber. The bread product has a total soluble fiber content of at least about 0.8 wt. % on a 42% moisture basis and a total beta-glucan content of at least about 0.2 wt. % on a 42% moisture basis.

47 Claims, No Drawings

LOW GLYCEMIC INDEX BREAD

BACKGROUND

Insulin resistance is the inability of the body to control blood glucose with normal levels of insulin. Insulin resistance can advantageously be reduced by consumption of diets high in foods with low glycemic indexes. The glycemic index (GI), which is an indication of the effect of a particular food product on a person's blood sugar, is the area under the curve of the glucose response to a carbohydrate-containing food compared to either a specific glucose dose or a specific amount of white bread. A growing body of research has shown that diets based on low GI foods can reduce the risk of diabetes, heart disease and certain cancers, can improve blood glucose control in people with diabetes, can reduce high blood fat levels, and can be useful for weight control. Because bread is a staple item in many diets, it would be desirable to produce a bread product that has a low glycemic index while not significantly sacrificing the bread quality characteristics, including density, texture, flavor and nutrition. A low GI bread product is generally considered to have a GI value of about 55 or less, compared to, for example, white sandwich bread, which has a GI value of about 70 to 80, based on glucose having a GI value of 100.

SUMMARY

The present invention is directed to a baked bread product that has a low glycemic index and to a composition useful for making the bread product. As used herein, the term "bread product" is not limited to bread, but refers to other bread-type products, including rolls and bagels. In one embodiment, the invention is directed to a baked bread product comprising a wheat flour product, a grain/seed source of soluble fiber, and a processed source of soluble fiber. The bread product has a total soluble fiber content of at least about 0.8 wt. % on a 42% moisture basis and a total beta-glucan content of at least about 0.2 wt. % on a 42% moisture basis.

In another embodiment, the invention is directed to a composition useful for making a low glycemic index bread product. The composition comprises a wheat flour product, a grain/seed source of soluble fiber, and a processed source of soluble fiber. The composition contains an amount of grain, nuts, and/or seeds of sufficient size so that at least about 20 wt. % of the total of the grain, nuts and/or seeds in the composition is retained by a sieve having a 12 US mesh sieve size.

DETAILED DESCRIPTION

The present invention is directed to a baked bread product that has a low glycemic index and to a composition useful for making a low glycemic index bread product. The low glycemic index bread product according to the invention contains a wheat flour product, a grain/seed source of soluble fiber, and a processed source of soluble fiber. The bread product has a total soluble fiber content of at least about 0.8 wt. % on a 42% moisture basis and a total beta-glucan content of at least about 0.4 wt. % on a 42% moisture basis.

The composition useful for making the bread product contains a wheat flour product, a grain/seed source of soluble fiber, and a processed source of soluble fiber. The composition is sufficiently coarse such that at least about 20 wt. %, preferably at least about 40 wt. %, of the total of any grain, nuts and seeds (which excludes whole wheat flour) in the composition is retained by sieve having a 12 US mesh sieve size.

The wheat flour product comprises whole wheat flour and/or wheat flour. Preferably the wheat flour product comprises at least about 50 wt. % whole wheat flour, more preferably at least about 100 wt. % whole wheat flour, based on the total weight of the wheat flour product (i.e., the total amount of flour in the baked bread product or the bread composition). The wheat flour product is included in the baked bread product in an amount preferably ranging from about 30 wt. % to about 50 wt. %, more preferably from about 40 wt. % to about 45 wt. %. If desired, the composition and bread product can further comprise one or more other flours, including rye flour, whole grain rye flour, durum flour, whole grain durum flour, barley flour, whole grain barley flour, oat flour, whole grain oat flour, spelt and whole grain spelt flour.

Whole wheat flour is particularly preferred because it is higher in fiber than, for example, wheat flour or rye flour. The baked bread product of the invention preferably contains at least about 6 wt. %, more preferably at least about 7 wt. %, still more preferably from about 7.2 wt. % to about 8.5 wt. %, yet more preferably about 7.9 wt. % total dietary fiber, on a 42% moisture basis, which is based on the total moisture content of the baked bread product. Additionally, the bread product preferably has a soluble fiber content of at least about 0.8 wt. %, more preferably at least about 1.0 wt. %, still more preferably from about 1.0 wt. % to about 1.6 wt. %, even more preferably about 1.3 wt. %, on a 42% moisture basis. The total insoluble fiber content of the baked bread product preferably ranges from about 6.0 to about 6.9 wt. %. The baked bread product has a total beta-glucan content of at least about 0.2 wt. %, more preferably from about 0.4 to about 0.8 wt. %, on a 42% moisture basis.

The bread composition preferably has a total soluble fiber content of at least about 0.7 wt. %, more preferably at least about 0.9 wt. %, still more preferably from about 0.9 wt. % to about 1.4 wt. %, even more preferably about 1.1 wt. %. The composition preferably has a total beta-glucan content of at least about 0.2 wt. %, more preferably at least about 0.4 wt. %.

Whole wheat flour contains more dietary fiber than wheat flour. Accordingly, to the extent that the amount of whole wheat flour in the wheat flour product decreases, it is desirable to supplement the bread product and composition with one or more sources of processed fiber, including, but not limited to, oats, soy, corn, wheat, barley, peas and cottonseed. In one preferred embodiment, the composition and bread product include soy protein concentrate or soy protein isolate extruded into crisp pieces, clusters or nuggets. In addition, or in the alternative, the fiber content of the bread product or composition can be increased by increasing the amount of grain/seed sources of soluble fiber, which are discussed in more detail below.

The presence and type of the soluble fiber in the bread can cause the bread to be digested slower, and thus increasing the amount of certain types of soluble fiber can aid in decreasing the GI index of the bread. Notably, more viscous soluble fiber sources have been found to be more beneficial in aiding to lower the GI index. However, in selecting the desired amount of soluble fiber in the bread, it should be recognized that there is a tradeoff between lowering the GI value and enhancing the bread quality characteristics, namely, reducing the density of the bread. For example, a bread having 1.6% soluble fiber would likely have a lower GI value than a bread having 1.3% soluble fiber, but the 1.3% soluble fiber bread would be less dense. When the baked bread product of the invention is in the form of bread or a roll, preferably it has a density (specific volume) from about 3.5 to about 4.5 cc/gram, more preferably from about 3.5 to about 4.0 cc/gram. When the baked bread product is in the form of a bagel, preferably it has a density from about 2.5 to about 3.5 cc/gram, more preferably from about 2.75 to about 3.25 cc/gram.

To improve the bread quality characteristics, including the GI value, the bread includes both a grain/seed source of soluble fiber and a processed source of soluble fiber. If only a processed source of soluble fiber is included, a relatively large amount would need to be used to achieve the desired soluble fiber content, thereby reducing the bread quality.

The grain/seed source of soluble fiber is any grain-type, nut-type or seed-type source of soluble fiber or a mixture thereof. Examples of suitable grain-type and seed-type sources of soluble fiber include wheat, rye, oats, barley (such as standard barley and waxy hulless barley, for example, the merlin, waxbar and prowashonupana varieties), triticale, corn, soy, rice, flaxseeds, sunflower seeds, millet, buckwheat, amarath, spelt and mixtures thereof. Examples of suitable nut-type sources include almonds, hazelnuts, walnuts, pecans and mixtures thereof. The inclusion of the grain/seed source of soluble fiber not only increases the nutritional value of the bread, but can enhance the flavor and/or texture of the bread. The grain/seed source of soluble fiber is preferably high in beta-glucan. Examples of grain/seed source of soluble fiber high in beta-glucan include oat, oat bran, rye, barley, barley bran and flaxseed. The grain/seed source of soluble fiber is present in the composition in a total amount preferably ranging from about 4 to about 12 wt. %, more preferably ranging from about 6 to about 11 wt. %, still more preferably from about 8 to about 10 wt. %.

The processed source of soluble fiber is a type of soluble fiber other than a grain/seed source of soluble fiber, as defined above. Examples of processed sources of fiber suitable for use in the invention include refined gums (including partially hydrolyzed gums), extracts high in pectin, herb extracts (such as psyllium), beta-glucan extracts from grains and mixtures thereof. Preferred refined gums include guar gum (including partially hydrolyzed), apple pectin and citrus pectin. A particularly preferred extract that is high in pectin is apple pectin concentrate. Beta-glucan extracts from grains that are useful in the invention include oat beta-glucan concentrate, barley beta-glucan concentrate, and rye beta-glucan concentrate. The processed source of soluble fiber is present in the composition in a total amount preferably ranging from about 0.05 to about 0.5 wt. %, more preferably ranging from about 0.05 to about 0.2% wt. %, still more preferably from about 0.1 to about 0.015 wt. %. However, the amount of the processed source of soluble fiber is particularly dependent on the particular type of processed source of soluble fiber, and thus the amount can vary as desired.

To slow digestion of the baked bread product, and thus lower the GI value, the bread composition should be sufficiently coarse. In other words, the composition should contain an amount of grain, nuts, and/or seeds of sufficient size so that at least about 20 wt. %, preferably at least about 40 wt. %, of the total of any grain, nuts and seeds in the composition is retained by a sieve having a 12 US mesh sieve size. In a particularly preferred embodiment, at least 75 wt. %, more preferably at least about 95 wt. %, of the total of any grain, nuts and seeds in the composition is retained by a sieve having a 20 US mesh sieve size. The coarseness of the grain, nuts and seeds can be enhanced, for example, by using coarse flour, using whole or cracked grains and/or by including soy protein isolate extruded into crisp pieces, clusters or nuggets.

The bread composition preferably contains other suitable bread ingredients, including yeast, vital wheat gluten, sweetener, oil, lecithin, salt, and additives. Examples of suitable sweeteners include sucrose, high fructose corn syrup, brown sugar, honey, molasses, malt syrup or powder, raisin juice concentrate, fructose, fruit juice, and fruit juice concentrates. Preferably the bread composition does not include dextrose (glucose) as a sweetener, and sweeteners that contain high levels of dextrose, such as high fructose corn syrup, need to be limited. Preferably the majority of the added sugar in the composition will be in the form of sucrose or fructose. The bread product can also include fruit and/or flavorings to enhance the flavor or texture of the product. However, the type and amount of fruit should be controlled so as not to adversely impact the GI value. If desired, dough conditioners and/or preservatives can be included in the bread composition, as would be understood by one skilled in the art.

Baked bread products in accordance with the invention can made by any suitable method, including the sponge and dough method and the straight dough method, as well as modifications of these methods. The sponge and dough method typically produces breads with better flavor and better shelf-life characteristics compared to breads made by the straight dough method. Optimal bread quality and shelf-life are obtained when the compositions according to the invention are made by the sponge and dough method where the grain/seed and non-grain/seed sources of soluble fiber are added in the sponge stage of the process.

In the sponge and dough method, a two-step mixing process is utilized. Initially part of the ingredients (part of the total flour, grain mix, yeast and water) of the bread composition are mixed into a "sponge" and allowed to ferment for approximately 3 to 4 hours at 86° F., 85% relative humidity. After the sponge fermentation is complete, the remainder of the ingredients are added to the sponge, and the second mixing step is conducted to form a dough. The dough is mixed at a suitable speed and for a suitable time to produce full development of the resulting dough product. The dough is allowed to rest in bulk for approximately ten minutes prior to being mechanically divided and scaled to the appropriate weight. The divided dough pieces are rounded and allowed to rest for about 5 to 10 minutes prior to machine moulding. The moulded dough pieces are placed in an appropriate pan for the given dough weight and placed in a proof box, preferably set at about 110° F. with proper humidity. After the dough has proofed to the appropriate height for the given pan, the pans are loaded into an oven and baked at approximately 350 to 400° F. for about 20 to 30 minutes, depending on the weight of the dough and the type of oven, as would be recognized by one skilled in the art. The baked bread products are immediately depanned and allowed to cool for a sufficient period of time, for example, one hour, before being bagged.

Alternatively, if the straight dough process is utilized, all of the ingredients in the composition are mixed into a dough in a single mixing step, and the sponge is eliminated. The dough is allowed to ferment for a suitable period of time, preferably from about 30 minutes to about 2 hours, more preferably about 1 hour, prior to being divided, scaled and processed as indicated above for the sponge and dough method. When using the straight dough method, it is likely that the amount of water and yeast may need to be increased somewhat relative to what is used when the sponge and dough method is utilized.

EXAMPLES

Examples 1 to 4

Four bread products were made having the compositions as set forth in Table 1, where each component is indicated as a percentage of the total wheat flour (percentage on a total flour basis). A separate composition is listed for the grain mix used in each example, and in that case, the percentage is based on the total weight of the grain mix (total grain mix basis). For each bread product, the sponge and dough method was employed. For each sponge, the liquid ingredients followed by the dry ingredients were placed in a Hobart 12 quart mixer with a McDuffy bowl attachment. The sponges were mixed on low speed for 1 min and then on high speed for 4 min at a set temperature of about 74° F. The sponges were allowed to ferment in a cabinet for 3 hours at 86° F., 85% relative humidity. The sponges were then introduced to a mixing bowl containing the dough ingredients and mixed with the dough ingredients for 1 minute on low speed and 8 minutes on high speed, with a finished dough product temperature of 80° F. The dough products were divided into 27.5 ounce pieces, round by hand and allowed to rest for five minutes prior to sheeting/moulding. The dough products were sheeted/moulded on an Oliver model 645-24B sheeter/moulder with the top sheeting roll on setting 2.2 and the bottom sheeting roll on setting 3.2. The pressure places and guides were adjusted to give proper moulding and the proper length dough piece for the pan. The pan utilized has the following dimensions: top inside –8.75 inches×5.5 inches; bottom outside 8.13 inches×5 inches; and depth –3 inches. The molded dough was placed in the pan seam side down, and the panned dough was placed in a proof cabinet at 110° F., 85% relative humidity. The dough products were removed from the cabinet after the dough obtained a height of ½ inch above the pan, which took approximately one hour. The dough products were baked in a rotating gas oven at 400° F. for about 28 minutes. The baked bread products were immediately depanned and allowed to cool on racks at room temperature for approximately 45 minutes prior to slicing on a reciprocating slicer (½ inch slice thickness) and bagging in polyethylene bags.

TABLE 1

| | Ex. 1 | Ex. 2 | Ex. 3 | Ex. 4 |
|---|---|---|---|---|
| Sponge | | | | |
| Stoneground Whole Wheat Flour - Fine | 60.0% | 60.0% | | |
| Stoneground Whole Wheat Flour - Coarse | | | 35.5% | 40.0% |
| Grain Mix | 25.0% | 25.0% | 25.0% | 25.0% |
| Vital Wheat Gluten | 14.0% | 14.0% | 7.0% | 7.0% |
| Compressed Yeast | 3.0% | 3.0% | 3.2% | 3.2% |
| Ascorbic Acid | 30 ppm | 30 ppm | 30 ppm | 30 ppm |
| Water | 66.5% | 66.5% | 43.5% | 48.0% |
| Dough | | | | |
| Stoneground Whole Wheat Flour - Fine | 40.0% | 40.0% | 64.5% | 40.0% |
| Stoneground Whole Wheat Flour - Coarse | | | | 20.0% |
| Brown Sugar, Light | 11.6% | 11.6 | 8.0% | 13.0% |
| Honey | 5.4% | 5.4% | 4.0% | 3.0% |
| Raisin Juice Concentrate | 2.3% | 2.3% | 3.5% | |
| Molasses, Dry | | | 1.4% | |
| Yeast | 2.0% | 2.0% | 1.0% | 2.0% |
| Salt | 2.0% | 2.0% | 2.0% | 2.0% |
| Ascorbic Acid | 120 ppm | 120 ppm | 120 ppm | 120 ppm |
| Water | 27.5% | 27.5% | 48.5% | 44.0% |
| Grain Mix | | | | |
| Waxy Hulless Barley, cracked (Merlin) | 33.2% | | 50.0% | 39.0% |
| Waxy Hulless Barley, cracked (Prowashonupana) | | 33.5% | | |
| Rye, cracked | 21.4% | 21.4% | | 2.5% |
| Wheat, crushed | | | 42.2% | |
| Soy, grits (full fat type) | | | | 7.5% |
| Oats, cracked | 10.6% | 10.6% | | |
| Oats, steel cut | | | | 3.2% |
| Corn Grits, coarse | 10.6% | 10.6% | | |
| Flaxseed, whole | 10.6% | 10.6% | | 10.0% |
| Triticale, cut | 7.1% | 7.1% | | 2.5% |
| Canola oil | 4.3% | 4.3% | 4.0% | 4.0% |
| Lecithin (Blendmax K, Central Soya) | | | 2.5% | 2.5% |
| Lecithin (Centrolux F, Central Soya) | 1.0% | 1.0% | | |
| Apple Extract (Herbapeck SF08) | 1.25% | | 1.3% | 1.3% |
| Guar Gum | | 0.9% | | |
| GI VALUE (Glucose = 100) | 44 ± 5 | 50 ± 3 | 52 ± 3 | 52 ± 4 |

The fine stoneground whole wheat flour used in the exemplary compositions had the following granulation:

On US 20W: 0% Maximum
On US 40W: 5.0%±5.0%
On US 60W: 10.0%±5.0%
On US 80W: 20.0%±5.0%
On US 20W: 15.0%±5.0%
Pan: 50.0%±5.0%

The coarse stoneground whole wheat flour used in the exemplary compositions had the following granulation:

On US 20W: 20.0%±5.0%
On US 40W: 30.0%±5.0%
On US 60W: 15.0%±5.0%
On US 80W: 10.0%±5.0%
On US 20W: 5.0%±5.0%
Pan: 20.0%±5.0%

The GI values for the baked bread products of the above examples, set forth in Table 1 above, were determined by Sydney University's Glycaemic Index Research Service (Sydney, Australia) as follows. Healthy, non-smoking human subjects were selected. Pure glucose sugar (dextrose; D-glucose), Sigma-Aldrich chemical company, Castle Hill, NSW, Australia) dissolved in water was used as the reference food. The reference food was prepared the day before required by dissolving 50 grams of pure glucose sugar in a glass of 250 mL of water, which was then covered and stored overnight in a refrigerator. The solution was brought to room temperature about 30 minutes before serving.

The test breads were weighed, wrapped and stored in a freezer. The evening before a bread was required for testing the next morning, a portion of the bread was taken from the freezer and left to defrost overnight. The next morning each defrosted portion of bread was presented to the test subject at room temperature.

The test subjects fasted for 10 to 12 hours the night before their test. A fasting blood sample was obtained from each subject prior to consumption of the test bread. The reference food and the test breads were all served in amounts providing 50 grams of available (digestible) carbohydrate. After the subject consumed the test bread or reference food, additional blood samples were taken at regular intervals over two hours to measure the total two-hour blood glucose response. The two-hour blood glucose response for the test food was compared to the two-hour blood glucose response produced by the same amount of carbohydrate in the form of pure glucose sugar, the reference food, which has a GI value equal to 100.

The concentration of glucose in the plasma component in each blood sample was analyzed in duplicate using the glucose hexokinase enzymatic method (Roche Diagnostic Systems, Sydney, Australia) and an automatic centrifugal spectrophotometric analyzer (Cobas Fara, Roche Diagnostics, Basel, Switzerland). The glucose concentrations in the blood samples for a given test bread or for the reference food were then used to graph a two-hour blood glucose response curve, which represents the subject's total two-hour glycemic response to that food. The area under this two-hour blood plasma glucose response curve (AUC) was calculated in order to obtain a single number, which indicates the magnitude of the total blood glucose AUC during the two-hour period. A GI value for the test food was then calculated by dividing the two-hour blood glucose response value for the test food by the subject's average two-hour blood glucose AUC value for the reference food and multiplying by 100 to obtain a percentage score. For each exemplary bread, the indicated GI value is the mean of 10 subjects' individual GI scores for the bread, with the standard deviation indicated.

The baked bread product of the invention has a GI value, as calculated in accordance with the above method, preferably about 55 or less, more preferably about 50 or less. As used herein, GI value refers to the mean value based on ten test subjects as calculated based on glucose equaling 100.

Example 5

A bagel product was made having the composition set forth in Table 2, where each component is indicated as a percentage of the total wheat flour (percentage on a total flour basis). The liquid ingredients followed by the dry ingredients were placed in a Hobart 12 quart mixer with a McDuffy bowl attachment and mixed on low speed for 2 minutes and then on medium speed for 6 min with a water temperature of about 70° F. and a dough temperature of about 78 to 80° F. The dough products were divided into 3.5 ounce pieces, rounded by hand and allowed to rest prior to sheeting on a laboratory dough sheeter with a ⁹⁄₁₆" gap between rollers. The dough was shaped into bagels, placed on a baking sheet, dusted with coarse cornmeal, and then held in a closed environment at 44° F. for 24 hours. The shaped bagels were cooked in a bagel boiler at 204° F. for thirty seconds on each side and then placed in a proof cabinet at 110° F., 95% relative humidity. The bagel products were removed from the cabinet after approximately 40 to 45 minutes. The bagel products were baked in a rotating gas oven at 400° F. for about 20 minutes.

The GI value for the baked bagel product of this example, also set forth in Table 2 below, was determined as described above with respect to Examples 1 to 4.

TABLE 2

| Dough | |
|---|---|
| Stoneground Whole Wheat Flour - Fine | 60.0% |
| Stoneground Whole Wheat Flour - Coarse | 40.0% |
| Grain Mix | 20.0% |
| Vital Wheat Gluten | 12.0% |
| Honey | 4.0% |
| Brown Sugar, Light | 6.0% |
| Salt | 2.0% |
| Yeast | 2.5% |
| Oven Springs #911 (Watson Foods) | 0.3% |
| Ascorbic Acid | 100 ppm |
| Water | 84.0% |
| Grain Mix | |
| Waxy Hulless Barley, cracked (Merlin) | 37.5% |
| Flaxseed, whole | 29.7% |
| Soy grits (full fat type) | 25.0% |
| Canola oil | 4.0% |
| Lecithin (Blendmax K, Central Soya) | 2.5% |
| Apple Extract (Herbapeck SF08) | 1.3% |
| GI VALUE (Glucose = 100) | 55 ± 3 |

The preceding description has been presented with reference to presently preferred embodiments of the invention. Workers skilled in the art and technology to which this invention pertains will appreciate that alterations and changes in the described products and methods may be practiced without meaningfully departing from the principal, spirit and scope of this invention. Accordingly, the foregoing description should not be read as pertaining only to the precise products and methods described, but rather should be read consistent with and as support to the following claims which are to have their fullest and fair scope.

What is claimed is:

1. A baked bread product comprising:
   (1) a wheat flour product;
   (2) a grain/seed source of soluble fiber; and
   (3) a processed source of soluble fiber;
   wherein the bread product has a total soluble fiber content of at least about 0.8% of the weight of the baked bread product on a 42% moisture basis and a total beta-glucan content of at least about 0.2% of the weight of the baked bread product on a 42% moisture basis, and wherein the amounts of the gain/seed source of soluble fiber and the processed source of soluble fiber are selected to provide a low glycemic index.

2. The baked bread product of claim 1, wherein the wheat flour product comprises at least about 50% whole wheat flour based on the total weight of the wheat flour product.

3. The baked bread product of claim 1, wherein the wheat flour product comprises 100% whole wheat flour based on the total weight of the wheat flour product.

4. The baked bread product of claim 1, wherein the wheat flour product is included in the baked bread product in an amount ranging from about 30 wt. % to about 50% of the weight of the baked bread product.

5. The baked bread product of claim 1, wherein the wheat flour product is included in the baked bread product in an amount ranging from about 40 wt. % to about 45% of the weight of the baked bread product.

6. The baked bread product of claim 1, wherein the grain/seed source of soluble fiber is selected from the group consisting of wheat, rye, oats, barley, triticale, corn, soy, rice, flaxseeds, sunflower seeds, millet, buckwheat, amarath, spelt, almonds, hazelnuts, walnuts, pecans and mixtures thereof.

7. The baked bread product of claim 1, wherein the grain/seed source of soluble fiber comprises at least one source high in beta-glucan selected from the group consisting of oat, oat bran, rye, barley, barley bran and flaxseed.

8. The baked bread product of claim 1, wherein the grain/seed source of soluble fiber comprises waxy-hulless barley.

9. The baked bread product of claim 1, wherein the processed source of soluble fiber is selected from the group consisting of refined gums, extracts high in pectin, herb extracts, beta-glucan extracts from grains and mixtures thereof.

10. The baked bread product of claim 1, wherein the processed source of soluble fiber comprises apple pectin or apple pectin concentrate.

11. The baked bread product of claim 1, wherein the processed source of soluble fiber comprises guar gum.

12. The baked bread product of claim 1, wherein the processed source of soluble fiber comprises psyllium.

13. The baked bread product of claim 1, further comprising at least one soy component selected from the group consisting of soy protein concentrate and soy protein isolate extruded into crisp pieces, clusters or nuggets.

14. The baked bread product of claim 1 having a total soluble fiber content of at least about 1.0% of the weight of the baked bread product on a 42% moisture basis.

15. The baked bread product of claim 1 having a total beta-glucan content of at least about 0.4% of the weight of the baked bread product on a 42% moisture basis.

16. The baked bread product of claim 1 comprising a total dietary fiber content of at least about 6% of the weight of the baked bread product on a 42% moisture basis.

17. The baked bread product of claim 1 comprising a total dietary fiber content of at least about 7% of the weight of the baked bread product on a 42% moisture basis.

18. The baked bread product of claim 1, wherein the baked bread product is in the form of bread or a roll and has a density ranging from about 3.5 to about 4.5 cc/gram.

19. The baked bread product of claim 18 having a density ranging from about 3.5 to about 4.0 cc/gram.

20. The baked bread product of claim 1, wherein the baked bread product is in the form of a bagel and has a density ranging from about 2.5 to about 3.5 cc/gram.

21. The baked bread product of claim 20 having a density ranging from about 2.75 to about 3.25 cc/gram.

22. The baked bread product of claim 1 having a glycemic index value of 55 or less.

23. The baked bread product of claim 1 having a glycemic index value of 50 or less.

24. The baked bread product of claim 1, wherein the baked bread product contains an amount of grain, nuts, and/or seeds of sufficient size so that at least about 40% of the total weight of the grain, nuts and/or seeds in the bread product is retained by a sieve having a 12 US mesh sieve size.

25. The baked bread product of claim 1, wherein the baked bread product contains an amount of grain, nuts, and/or seeds of sufficient size so that at least about 75% of the total weight of the grain, nuts and/or seeds in the composition is retained by a sieve having a 20 US mesh sieve size.

26. The baked bread product of claim 1, wherein the baked bread product contains an amount of grain, nuts, and/or seeds of sufficient size so that at least about 95% of the total weight of the grain, nuts and/or seeds in the composition is retained by a sieve having a 20 US mesh sieve size.

27. The baked bread product of claim 1, wherein:
the wheat flour product comprises at least about 50% whole wheat flour based on the total weight of the wheat flour product;
the grain/seed source of soluble fiber is selected from the group consisting of oat, oat bran, rye, barley, barley bran and flaxseed;
the processed source of soluble fiber is selected from the group consisting of psyllium, beta-glucan extracts, apple pectin, and apple pectin concentrate; and
the bread product has a total beta-glucan content of at least about 0.4% of the weight of the baked bread product on a 42% moisture basis.

28. A composition comprising:
(1) a wheat flour product;
(2) a grain/seed source of soluble fiber, and
(3) a processed source of soluble fiber;
wherein the composition contains an amount of grain, nuts, and/or seeds of sufficient size so that at least about 20% of the total weight of the grain, nuts and/or seeds in the composition is retained by a sieve having a 12 US mesh sieve size, and the amounts of the grain/seed source of soluble fiber and the processed source of soluble fiber are selected to provide a low glycemic index.

29. The composition of claim 28, wherein the wheat flour product comprises at least about 50% whole wheat flour based on the total weight of the wheat flour product.

30. The composition of claim 28, wherein the wheat flour product comprises 100% whole wheat flour based on the total weight of the wheat flour product.

31. The composition of claim 28, wherein the grain/seed source of soluble fiber is selected from the group consisting of wheat, rye, oats, barley, triticale, corn, soy, rice, flaxseeds, sunflower seeds, millet, buckwheat, amarath, spelt, almonds, hazelnuts, walnuts, pecans and mixtures thereof.

32. The composition of claim 28, wherein the grain/seed source of soluble fiber comprises waxy-hulless barley.

33. The composition of claim 28, wherein the grain/seed source of soluble fiber comprises at least one source high in beta-glucan selected from the group consisting of oat, oat bran, rye, barley, barley bran and flaxseed.

34. The composition of claim 28, wherein the grain/seed source of soluble fiber is present in the composition in a total amount ranging from about 4 to about 12% of the weight of the composition.

35. The composition of claim 28, wherein the grain/seed source of soluble fiber is present in the composition in a total amount ranging from about 8 to about 10% of the weight of the composition.

36. The composition of claim 28, wherein the processed source of soluble fiber is selected from the group consisting of refined gums, extracts high in pectin, herb extracts, beta-glucan extracts from grains and mixtures thereof.

37. The composition of claim 28, wherein the processed source of soluble fiber comprises apple pectin or apple pectin concentrate.

38. The composition of claim 28, wherein the processed source of soluble fiber comprises guar gum.

39. The composition of claim 28, wherein the composition contains an amount of grain, nuts, and/or seeds of sufficient size so that at least about 40% of the total weight of the grain, nuts and/or seeds in the composition is retained by a sieve having a 12 US mesh sieve size.

40. The composition of claim 28, wherein the composition contains an amount of grain, nuts, and/or seeds of sufficient size so that at least about 75% of the total weight of the grain, nuts and/or seeds in the composition is retained by a sieve having a 20 US mesh sieve size.

41. The composition of claim 28, wherein the composition contains an amount of grain, nuts, and/or seeds of sufficient size so that at least about 95% of the total weight of the grain, nuts and/or seeds in the composition is retained by a sieve having a 20 US mesh sieve size.

42. The composition of claim 28, further comprising at least one additional ingredient selected from the group consisting of yeast, vital wheat gluten, sweetener, oil, lecithin, and salt.

43. The composition of claim 28, further comprising yeast.

44. The composition of claim 28 having a total soluble fiber content of at least about 0.7% of the weight of the composition.

45. The composition of claim 28 having a total soluble fiber content of at least about 0.9% of the weight of the composition.

46. The composition of claim 28 having a total beta-glucan content of at least about 0.2% of the weight of the composition.

47. The composition of claim 28 having a total beta-glucan content of at least about 0.4% of the weight of the composition.

* * * * *